Patented May 20, 1930

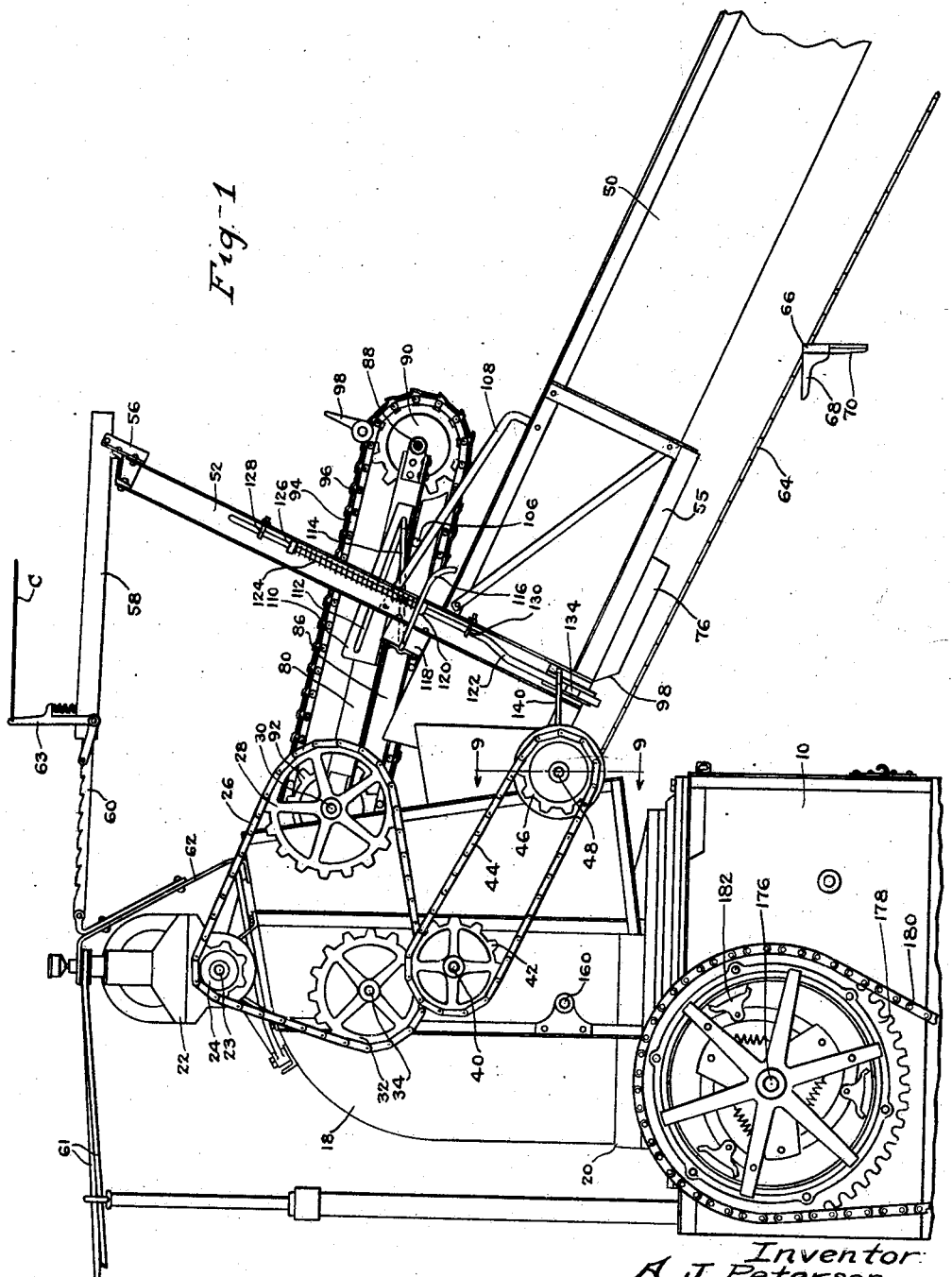

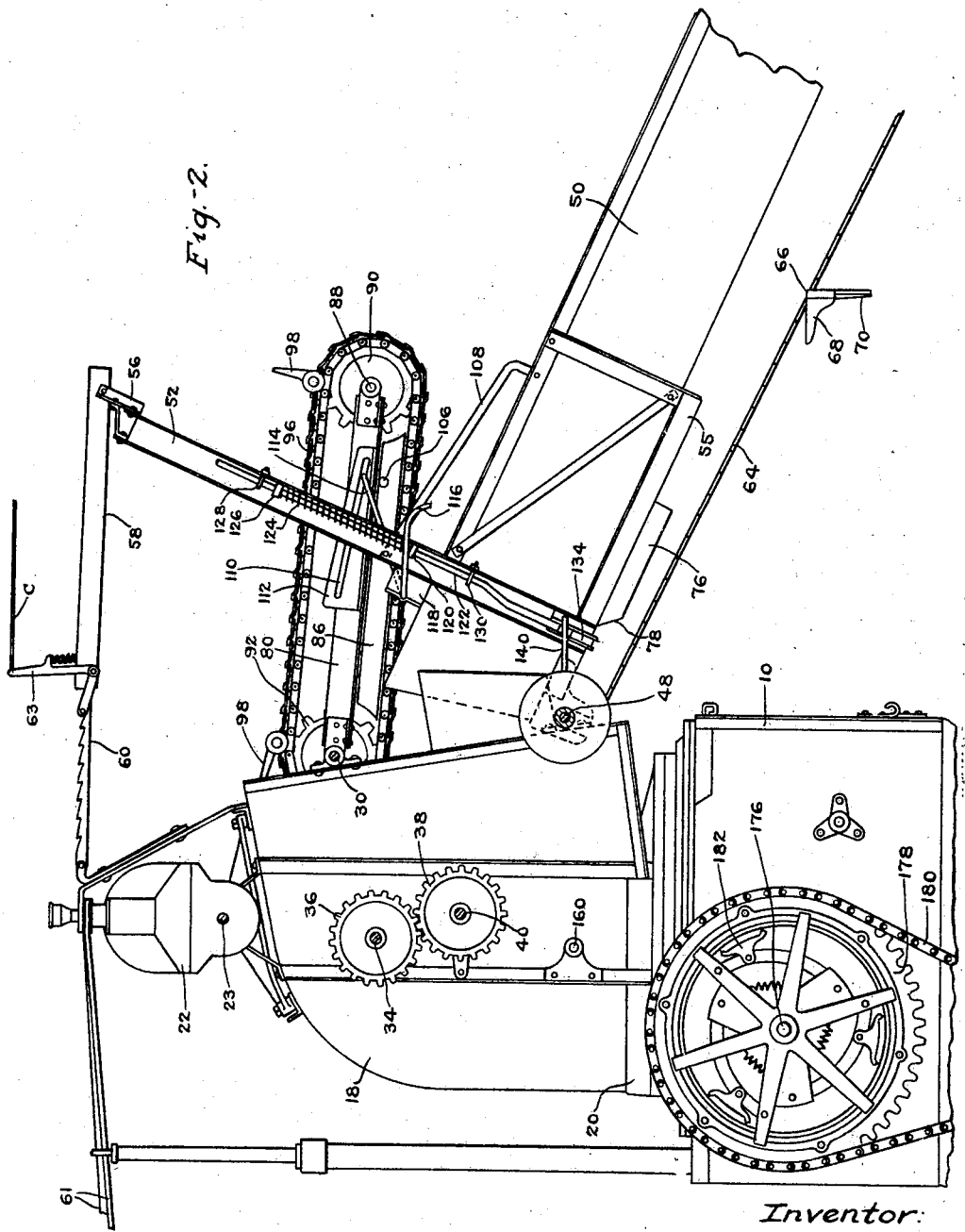

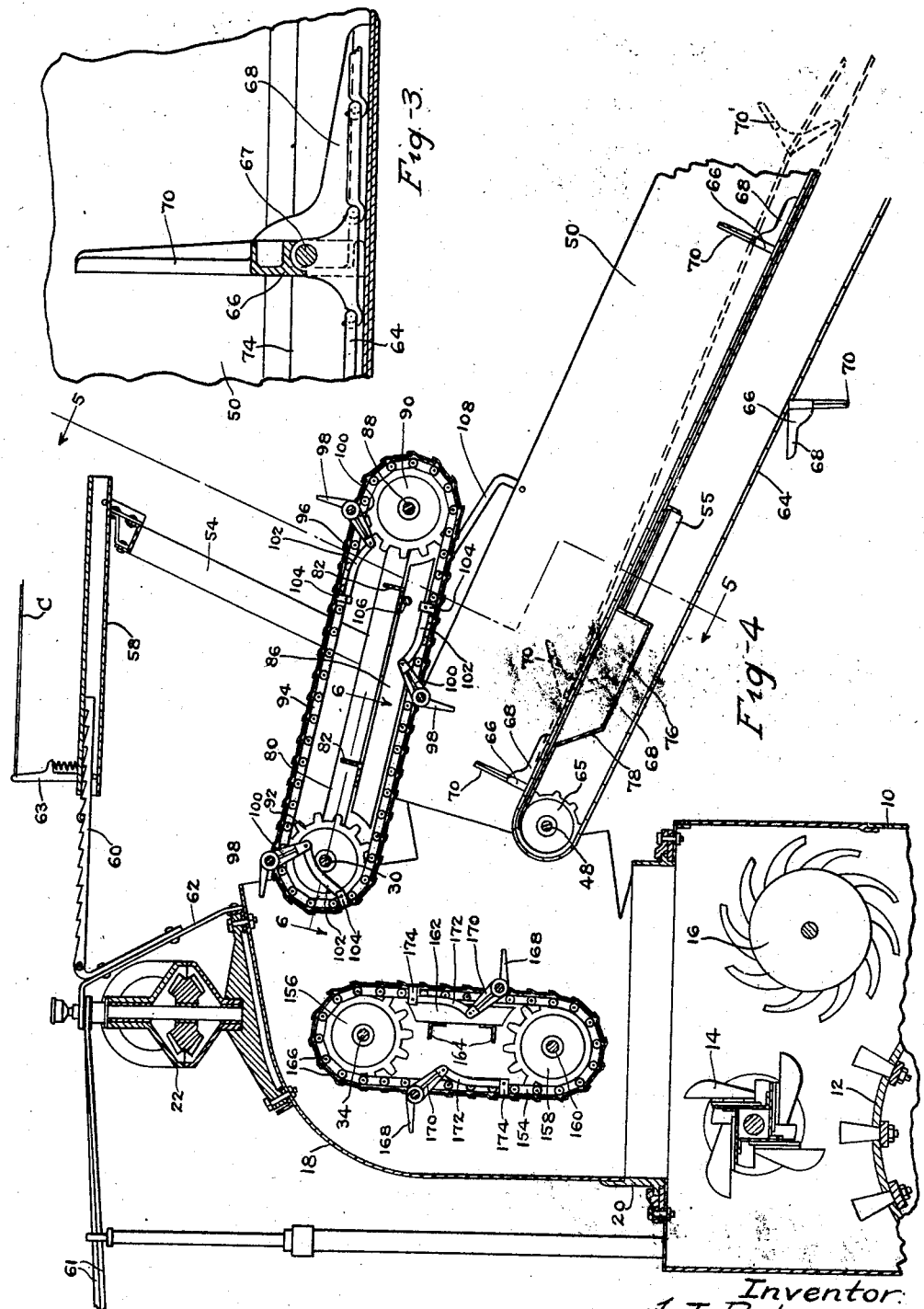

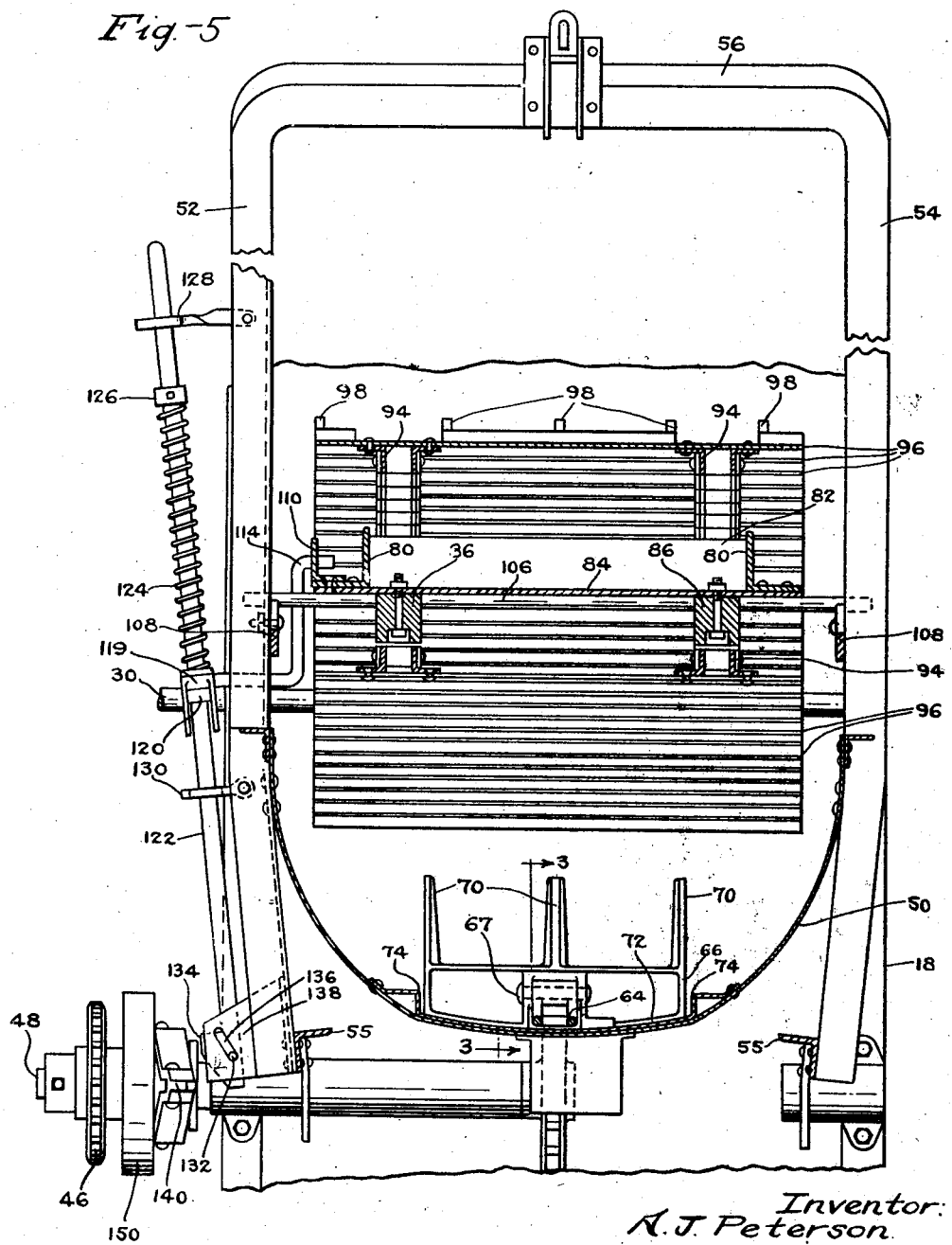

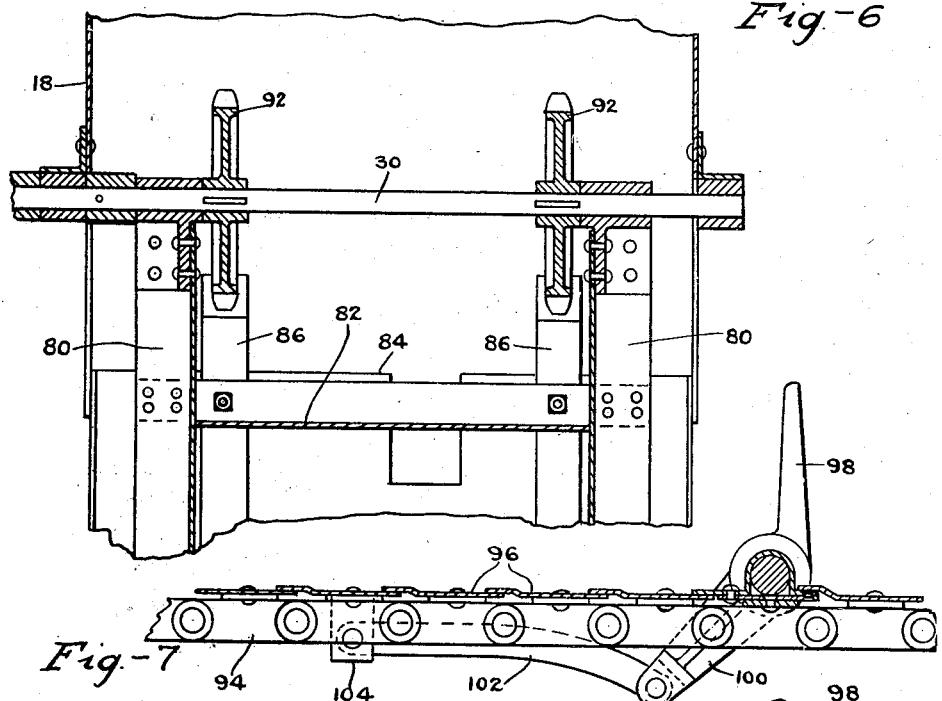
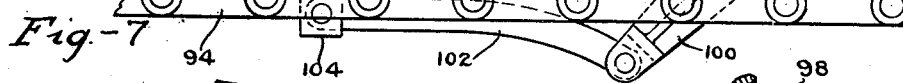
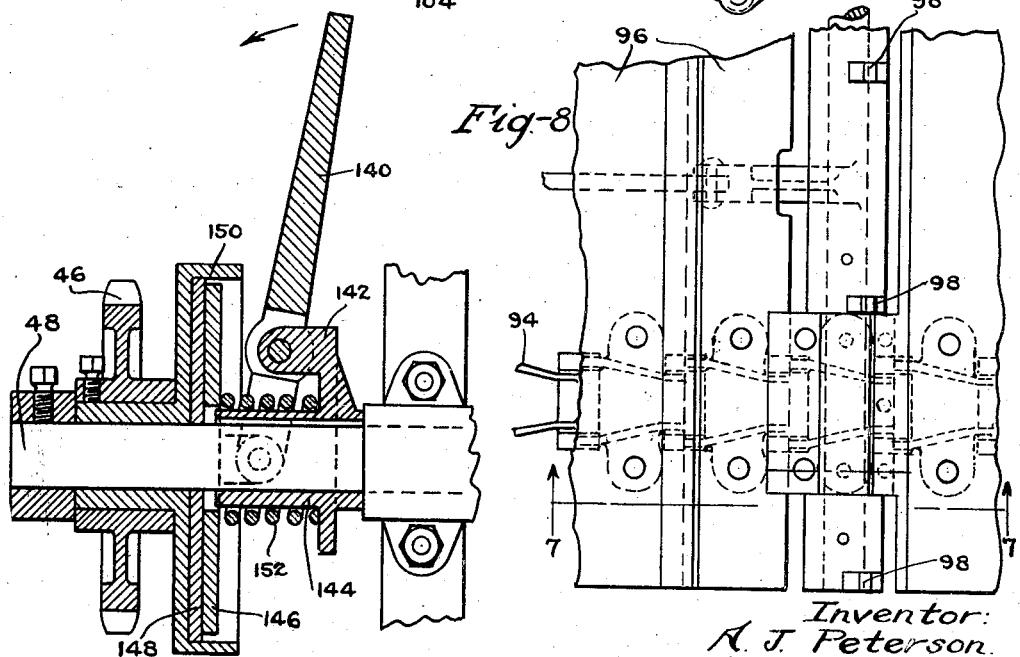
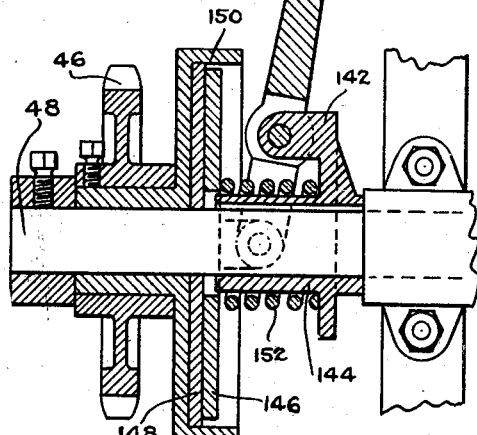

1,759,709

UNITED STATES PATENT OFFICE

ANDREW J. PETERSON, OF ISANTI, MINNESOTA

FEEDING MECHANISM FOR THRASHING MACHINES

Application filed October 27, 1927. Serial No. 229,070.

My invention relates to feeding mechanism for thrashing machines. An object is to provide efficient means for receiving bundles of grain and conveying them to a point above the thrashing cylinder in such manner as to avoid liability of clogging. Another object is to provide an endless conveyor for carrying bundles combined with means for disconnecting the driving mechanism of this conveyor whenever the amount of bundles fed to the thrashing machine becomes greater than a certain desired amount, whereby overfeeding is prevented. Another object is to provide an overhead feeder mechanism which will operate to assist in forwarding the bundles when the main conveyor is being driven and which will continue to operate and feed the top bundles when the main conveyor is disconnected, as previously stated. It is a further object of the invention to provide the overhead feeder with feed fingers which will be readily released from the bundles at the time when the feeding function is finished. A still further object is to provide a vertically operating feeder which takes the bundles delivered from between the main conveyor and overhead feeder and passes them on to the thrashing cylinder.

The full objects and advantages of my invention will appear in connection with the detailed description thereof, and the novel features of my inventive idea will be particularly pointed out in the claims.

In the accompanying drawings, which illustrate a practical embodiment of my invention,—

Fig. 1 is a side elevational view of the mechanism. Fig. 2 is a side elevational view partly in vertical section and showing some of the parts moved into another position. Fig. 3 is a fragmentary view of a feeding device on the line 3—3 of Fig. 5. Fig. 4 is a view in central vertical section. Fig. 5 is a view in section on the line 5—5 of Fig. 4. Fig. 6 is a view in section on the line 6—6 of Fig. 4 with the chains removed. Fig. 7 is a view in section on line 7—7 of Fig. 8. Fig. 8 is a top plan view of what is shown in Fig. 7. Fig. 9 is a view substantially in section on the line 9—9 of Fig. 1 but showing a rotating arm in a different position.

Referring to the construction shown in the drawings, the numeral 10 designates a casing which is mounted upon the front of the thrashing machine and which contains the customary thrashing cylinder 12, band cutter 14, and retarder 16, as shown in Fig. 4. Mounted on the casing 10 is a hood 18 which at its lower end has a flanged ring 20 by means of which it is attached for rotative movement on said casing. Supported upon the hood 18 is a gear housing 22 containing gearing driven in any suitable manner preferably from the shaft of the cylinder 12 and which gearing in turn drives a shaft 23 to which is secured a sprocket wheel 24 which engages a sprocket chain 26 passing around a sprocket wheel 28 secured to a shaft 30 and also passing around a sprocket wheel 32 secured to a shaft 34. As will be seen in Fig. 2, a gear 36 is secured to the shaft 34 and this gear meshes with a gear 38 secured to a shaft 40. As will be apparent from Fig. 1, a sprocket wheel 42 is secured to the end of the shaft 40 and a sprocket chain 44 engages the sprocket wheel 42 and passes around a sprocket wheel 46 adapted to be clutched to a shaft 48 in a manner to be described later. Pivotally attached to the front of the hood 18 is a trough 50 having the shape shown in cross section in Fig. 5. Upwardly extending arms 52 and 54 are secured to a frame work 55 attached to the trough 50 and the upper ends of these arms are connected by a cross bar 56 to which is secured a rearwardly extending tubular member 58 within which telescopes a ratchet bar 60 pivoted at its rear end to a support 62 carried by the hood 18, this support being held firmly in position by bars 61 which extend back to the frame of the thrashing machine and are secured thereto. A spring-pressed bellcrank detent 63 is pivoted to the member 58 so as to engage the teeth of the ratchet bar 60 and hold the trough 50 in adjusted position. This trough may be swung upwardly by lifting its front end and may be lowered by pulling on a cord C to release the detent from one or more notches of the ratchet bar according to the amount of adjustment desired. An endless conveyor chain 64 has its upper stretch adapted to travel in the bottom of the trough 50 and this chain is driven by passing around a sprocket wheel 65 secured to the shaft 48. A plurality of castings 66 are pivotally attached to the links of the chain 64 by rivets or pintles 67 as shown in Figs. 3 and 5. These castings have base members 68 from which fingers 70 extend at right angles, there preferably being three fingers for each casting as shown in Fig. 5. In order to prevent the chain 64 from being pushed sidewise by the bundles, a strip 72 is secured in the bottom of the trough and this strip has angular portions 74 which serve as marginal guides for the chain conveyor. If the trough 50 becomes choked with bundles, the fingers tilt into the position indicated at 70' in Fig. 4 and if the resistance is sufficiently great, the castings will turn over. If the castings should pass around the sprocket wheel 65 in this turned-over position, a damage would result. Therefore, I provide the trough 50 with a depressed portion 76 having an inclined rear end 78 near the sprocket wheel 65. When the castings reach the depressed portion 76, they assume the position shown in dotted lines in Fig. 4 on account of the base member 68 being heavier than the fingers 70 carried thereby. The base member rides up the incline 78, thereby righting the casting so that it will pass properly over the sprocket wheel 65. An overhead feeding device is provided in spaced relation above the rear portion of the trough 50, and this overhead feeder will now be described. Two angle bars 80 are pivotally connected at their rear ends to the hood 18 so as to turn around the shaft 30 as a center, the bearings of this shaft being secured to the front of the hood. The bars 80 are connected by cross bars 82 while a plate 84 is secured to the lower side of the bars 80, as shown in Fig. 5. Longitudinal bars 86 are secured to the lower side of the cross bars 82 and plate 84. The front ends of the bars 80 have bearings for a shaft 88 to which a pair of sprocket wheels 90 are secured. A corresponding pair of sprocket wheels 92 is secured to the shaft 30, and a pair of endless chains 94 pass around the sprocket wheels 90 and 92. These chains are connected by transverse slats 96 which overlap each other, as best shown in Fig. 7. A plurality of feeding fingers 98 are pivotally attached to the chains 94, these fingers having inwardly extending arms 100 connected by links 102 with blocks 104 secured to the chains. The links 102 normally hold the fingers 98 in outstanding position but when the fingers are carried upwardly around the sprocket wheels 92, the links 102 as will be obvious from Fig. 4 exert a thrust upon the ends of the arms 100 with the result that the fingers are swung backwardly into tangential relation to the sprocket wheels. This causes the fingers to readily slip out of the bundles after the feeding function has been performed so that there is no tendency to carry the bundles upwardly. A transverse rod 106 held by the bars 86 has its ends normally resting upon inclined bars 108 carried by the trough so that the forward portion of the overhead feeder is free to lift relatively to the trough 50 and yet when the front end of the trough is adjusted up or down, the front end of the overhead device will be correspondingly adjusted. In case too many bundles are fed into the trough so that clogging results, then the piling up of bundles lifts the front end of the overhead feeder from the position shown in Fig. 1 into that shown in Fig. 2. The travel of the chain 64 in the trough is thereby stopped by the mechanism now to be described. A plate 110 is secured to one of the bars 80 and this plate has an inclined slot 112 therein. A rod is bent so as to have an inner arm 114 and an outer arm 116 extending in different directions as shown in Fig. 1. This rod at the junction of the two arms is pivoted to a support 118 secured to the arm 52. The end of the arm 114 is bent so as to fit slidably in the slot 112 while the arm 116 has an enlargement 119 as shown in Fig. 5 adapted to rest upon a collar 120 carried by a rod 122 which is slidably mounted on the arm 52. It will be understood that the enlargement 119 has a perforation through which the rod 122 passes. A coiled spring 124 surrounding a portion of the rod 122 is interposed between the enlargement 119 and a collar 126 secured to the rod. This rod is held for sliding movement by passing through a perforation in a member 128 and through a slot in a member 130, these members being secured to the arm 52. The lower end of the rod 122 carries an outstanding pin 132 and a cam 134. The pin 132 slides in an inclined slot 136 formed in a plate 138 secured to the lower end of the arm 52. When the cam 134 is moved outwardly, it is engaged by the outer arm of a lever 140 which rotates with the shaft 48. This lever is pivoted to a bracket 142 carried by a sleeve 144 splined on the shaft 48. The inner arm of the lever 140 is forked and pivoted to a clutch disk 146 which engages a clutch disk 148, these disks being located within a drum 150 having a hub loose on the shaft 48 and to which the sprocket wheel 46 is secured. A coiled spring 152 interposed between the disk 146 and the enlarged end of the sleeve 144 normally keeps the disks in clutching engagement with the drum. In the hood 18 and beyond the ends of the trough 50 and the overhead feeder, there is a vertically disposed feeder which in many respects is similar to the overhead feeder previously described. This vertical feeder includes a pair of chains 154 which pass around sprocket wheels 156 secured to the shaft 34 and sprocket wheels 158 secured to a shaft 160. The chains 154 on the feeding side of the device are backed up by vertical bars 162 secured to cross bars 164 carried by the hood 18. The chains 154 are connected by slats 166 which overlap each other. A plurality of feeding fingers 168 are pivotally attached to the chains, these fingers having inwardly extending arms 170 connected by links 172 with blocks 174 secured to the chains. The links 172 normally hold the fingers 168 in outstanding position but when they pass around the sprocket wheels they assume a tangential relation to the same so that they slip out of the bundles after their feeding function has been performed. The manner in which the shaft 176 of the thrashing cylinder 12 is driven will be only briefly referred to since this manner of driving forms no part of the present invention. Loosely mounted on this shaft is a sprocket wheel 178 driven by a sprocket chain 180. Operated by the wheel 178 there are centrifugal clutch devices 182 so disposed that the cylinder is rotated only after the wheel 178 has attained a considerable speed. Since the feeder mechanism is preferably operated from the cylinder shaft as previously stated, the feeder mechanism will not start until the cylinder is running at a high rate of speed.

The operation of the mechanism has been quite fully stated in connection with the foregoing detailed description. While only one complete feeder mechanism has been described, it will be understood that more than one may be employed, as for instance,—in the nature of twin feeders for feeding bundles into one separator.

I claim:

1. A feeding mechanism for thrashing machines comprising a trough pivotally attached at its rear end on the machine, an endless chain device whose upper stretch travels in the bottom of said trough for feeding bundles, a support extending upwardly from said trough, a tubular member pivotally attached to the upper end of said support and extending rearwardly therefrom, a ratchet bar telescoping in said tubular member, a support to which the rear end of said ratchet bar is pivotally attached, and a spring-pressed detent pivotally attached to said tubular member for engagement with the teeth of said ratchet bar.

2. A feeding mechanism for thrashing machines comprising a trough pivotally attached at its rear end on the machine, an endless chain device whose upper stretch travels in the bottom of said trough for feeding bundles, an overhead feeder above said trough and pivotally mounted at its rear end, the front portion of said feeder being supported by said trough for swinging movement therewith, two arms extending upwardly from said trough and between which said overhead feeder is positioned, a cross bar connecting the upper ends of said arms, a tubular member pivotally attached to said cross bar and extending rearwardly therefrom, a ratchet bar telescoping in said tubular member, a support to which the rear end of said ratchet bar is pivotally attached, and a spring-pressed detent pivotally attached to said tubular member for engagement with the teeth of said ratchet bar.

3. A feeding mechanism for thrashing machines comprising a support, sprocket wheels mounted in spaced relation on said support, endless sprocket chains passing around said wheels for feeding bundles, feeding fingers pivoted intermediate their lengths to said chains, and links pivoted at one of their ends to the inner ends of said fingers and pivoted at the other of their ends to said chains for holding said fingers in outstanding position with relation to the straight portion of said chains and causing them to assume a backwardly inclined relation when said chains pass around said wheels at the delivery end of the mechanism.

4. A feeding mechanism for thrashing machines comprising a support, sprocket wheels mounted in spaced relation on said support, endless chains passing around said wheels for feeding bundles, feeding fingers attached to said chains, and transverse slats secured to said chains in overlapping relation.

5. A feeding mechanism for thrashing machines comprising a support, sprocket wheels mounted in spaced relation on said support, endless chains passing around said wheels for feeding bundles, feeding fingers attached to said chains, fixed longitudinal members which back up said chains on their feeding stretch, and transverse slats secured to said chains in overlapping relation.

In testimony whereof I hereunto affix my signature.

ANDREW J. PETERSON.